(12) United States Patent
Ghosh et al.

(10) Patent No.: US 10,984,225 B1
(45) Date of Patent: Apr. 20, 2021

(54) MASKED FACE RECOGNITION

(71) Applicant: Accenture Global Solutions Limited, Dublin (IE)

(72) Inventors: Sankar Ghosh, Navi Mumbai (IN); Karishma Khanna, Bangalore (IN); Bolaka Mukherjee, Howrah (IN); Ankur Garg, Gurgaon (HR); Srivani Mareddy, Hyderabad (IN); Sowmya Rasipuram, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/035,587

(22) Filed: Sep. 28, 2020

(51) Int. Cl.
*G06K 9/00* (2006.01)
*G06N 3/08* (2006.01)
*G06K 9/62* (2006.01)

(52) U.S. Cl.
CPC ..... *G06K 9/00288* (2013.01); *G06K 9/00228* (2013.01); *G06K 9/00268* (2013.01); *G06K 9/6211* (2013.01); *G06N 3/08* (2013.01)

(58) Field of Classification Search
CPC .......... G06K 9/00288; G06K 9/00268; G06K 9/6211; G06K 9/00228; G06N 3/08
See application file for complete search history.

(56) References Cited

U.S. PATENT DOCUMENTS

| | | | |
|---|---|---|---|
| 2013/0163829 A1* | 6/2013 | Kim | G06K 9/00 382/118 |
| 2019/0236342 A1* | 8/2019 | Madden | G06K 9/00228 |
| 2020/0327309 A1* | 10/2020 | Cheng | G06N 3/0445 |

* cited by examiner

*Primary Examiner* — Chan S Park
*Assistant Examiner* — Elisa M Rice
(74) *Attorney, Agent, or Firm* — Norton Rose Fulbright US LLP

(57) ABSTRACT

Embodiments of the present disclosure provide systems and methods for recognizing a masked face. According to the present disclosure, the disclosed systems and methods include features that provide augmentation of existing face recognition databases, real-time mask detection, and real-time masked face recognition. In embodiments, masked face recognition includes a multi-layered approach, which includes finding matching simulated masked faces in the database that match the masked face being analyzed, comparing the unmasked portion of the masked face to stored unmasked faces in a database to identify any matches, and executing face restoration algorithms in which the masked portion is reconstructed to generate an unmasked representation which may then be matched against unmasked faces in the database.

20 Claims, 8 Drawing Sheets

MASKED FACE RECOGNITION

TECHNICAL FIELD

The present application relates to face recognition and more specifically to systems and methods for masked face recognition.

BACKGROUND

Biometrics enabled authentication applications are very useful tools, which is why it is not surprising they are used in many applications. Face recognition in particular has gained a lot of ground with the development of faster processing devices. However, these tools, and especially face recognition, are substantively affected in the current pandemic situation. Even touchless facial recognition technology cannot effectively recognize masked faces. Removing masks for authentication increases risk of exposure to infections and it is sometimes too inconvenient. As a result, the impact is global across healthcare, retail, transport, telecommunications, media advertising, public services, and all industries relying on traditional face recognition systems be it for marking attendance, security checks or surveillance. In addition, criminals, shoplifters, fraudsters, and terrorists are taking advantage of this technology challenge in evading identification due to face masks.

SUMMARY

The present application discloses systems, methods, and computer-readable storage media providing functionality that enables face detection even when a user is wearing a mask. In embodiments, the disclosed systems and methods include features that provide augmentation of existing face recognition databases, real-time mask detection, and real-time masked face recognition.

In embodiments, existing databases, which might store images of users with unmasked faces, may be augmented. This database augmentation may be accomplished by performing simulated facial indexing in which a masked face may be simulated, e.g., by superimposing a mask on an unmasked face stored in a database, and generating facial embeddings and eigenvectors from the simulated masked faces for storage in the database. These facial embeddings and/or eigenvectors may be used during operations.

In embodiments, systems and methods disclosed herein provide functionality to detect whether a person in a picture is wearing a mask. For example, when an unmasked person is detected, the system may execute face recognition algorithms to determine the identity of the person, and then an alert may be generated and sent to the person, where appropriate and where possible, letting them know that they are unmasked. Such an alert may be sent to the person's mobile device, for example. Such alerts may also be sent to other individuals or responsible entities who may be required to know information on mask-wearing to ensure compliance.

In aspects, the systems and methods disclosed herein provide functionality for masked face recognition. In embodiments, masked face recognition may include a multi-layered approach, which may include finding matching simulated masked faces in the database that match the masked face being analyzed. The multi-layered approach may also include comparing the unmasked portion of the masked face to stored unmasked faces in a database to identify any matches. The multi-layered approach may also include executing face restoration algorithms in which the masked portion is reconstructed to generate an unmasked representation which may then be matched against unmasked faces in the database. In embodiments, the face restoration process may leverage the simulated masked face technique and the unmasked portion technique to refine the face restoration process. The results from the different layers may be analyzed and selectively weighted to increase the accuracy of a face recognition determination. Further, results from one or more layers may be fed back into the recognition process layers to improve the certainty of a facial recognition determination. In any case, the result of this layered analysis provides a more effective and efficient masked face recognition technique.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
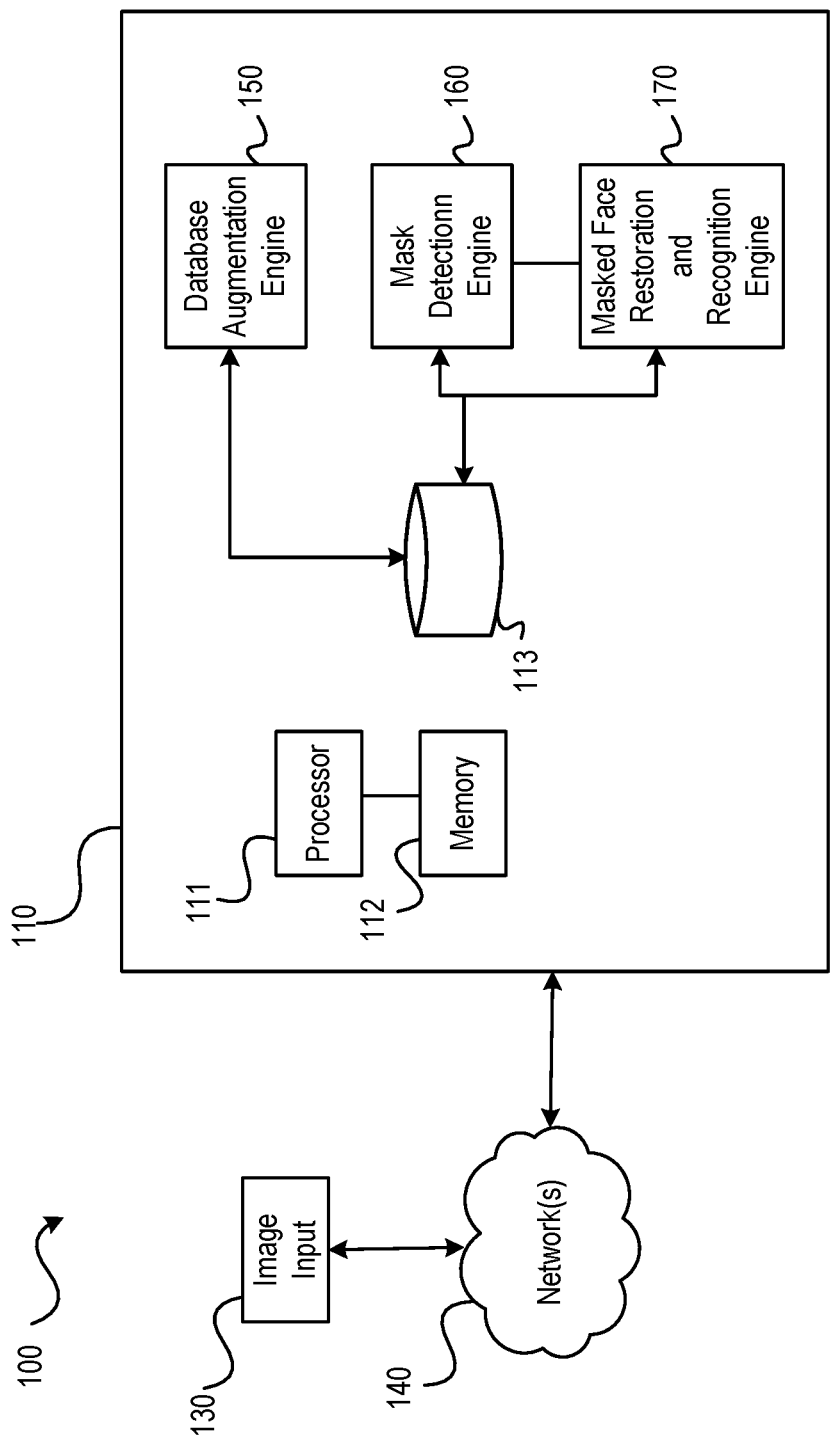
FIG. 1 is a block diagram of a system for providing masked face recognition in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The systems and methods disclosed herein provide a contextual and integrated approach for masked face recognition. In particular, the disclosed systems and methods may include a masked face recognition approach that provides for one or more of augmentation of existing face recognition databases, real-time mask detection, and real-time masked face recognition. For example, database augmentation may include simulating a masked face, e.g., from an unmasked face stored in a database, and generating facial embeddings (e.g., using facial embeddings generation architectures such as FaceNet) from the simulated masked faces for storage in the database.

Additionally, aspects may include systems and methods that provide functionality to detect whether a person in a picture is wearing a mask. In embodiments, when an unmasked person is detected, the system may execute face recognition algorithms to determine the identity of the person, and then an alert may be generated and sent to the person, where appropriate and where possible, letting them know that they are unmasked. Such an alert may be sent to the person's mobile device, for example. Such alerts may also be sent to other individuals or entities. Moreover, aspects may include systems and methods that provide functionality to recognize masked faces, without the need to remove the mask. In embodiments, this masked face recognition may be a multi-layered approach which may include matching the masked face to a masked face stored in a database (e.g., the augmented database), comparing the unmasked portion of the masked face to stored faces in a database to identify any matches, and executing face restoration in which the masked portion is reconstructed to generate an unmasked representation which may then be matched against unmasked faces in the database. The result of this layered analysis may be combined to provide a more effective and efficient masked face recognition technique.

Referring to FIG. 1, a block diagram of a system providing masked face recognition in accordance with embodiments of the present disclosure is shown as a system 100. As shown in FIG. 1, system 100 may include server 110, image input 130, and network 140. These components, and their individual components, may cooperatively operate to provide functionality in accordance with the discussion herein. For example, in operation according to embodiments, an image may be received or obtained, e.g., via network 140, by server 110 from image input 130. In some aspects, image input 130 may represent a user terminal via which a user may upload images that may include masked faces to server 110, and may cause execution of a process that leverages the features provided by server 110, as will be discussed in more detail below, in order to provide masked face recognition features. In aspects, image input 130 may represent an image database, a streaming service, a video stream, an image stream, etc., configured to provide one or more images to server 110. Image input 130 may also include a user device, a camera corresponding to a security system, one or more public cameras, etc., along with intermediate processing/communication devices, which function to provide images to server 110 for image storage and/or recognition.

The various components of server 110 may cooperatively operate to analyze the images received, and may apply rules, algorithms, machine learning algorithms, and other analytical processes, as described herein, to provide database augmentation, mask detection, and masked face recognition using the received images in accordance with embodiments of the present disclosure. In some embodiments, the process performed by server 110 may be automated, although a user may initiate the process.

What follows is a more detailed discussion of the functional blocks of system 100 shown in FIG. 1. However, it is noted that the functional blocks, and components thereof, of system 100 of embodiments of the present invention may be implemented using processors, electronic devices, hardware devices, electronic components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 140.

In some aspects, server 110 and image input 130 may be communicatively coupled via network 140. Network 140 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

As noted above, server 110 may be configured to receive and/or obtain images (e.g., from image input 130) and to apply processes and features to provide masked face recognition in accordance with embodiments of the present disclosure. Server 110, in particular, may provide features that include augmentation of existing face recognition databases, real-time mask detection, and real-time masked face recognition.

The functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some embodiments, server 110 may be implemented, wholly or in part, on an on-site system, or on a cloud-based system.

As shown in FIG. 1, server 110 includes processor 111, memory 112, database 113, database augmentation engine 150, mask detection engine 160, and masked face restoration and recognition engine 170. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure.

In aspects, memory 112 may also be configured to facilitate storage operations. For example, in some embodiments, memory 112 may comprise database 113. In other embodiments, database 113 may be part of a system external to system 100. In some embodiments, database 113 may be integrated into memory 112, or may be provided as a separate module. In some aspects, database 113 may be a single database, or may be a distributed database implemented over a plurality of database modules. In some embodiments, database 113 may be provided as a module external to server 110.

Database 113 may be configured for storing analysis data, models, classifiers, rankers, usage metrics, analytics, user preferences, and/or any other information or data to facilitate masked face recognition operations and analysis in accordance with aspects of the present disclosure. In addition, database 113 may include a facial embeddings database for storing facial embeddings encoded from face images in accordance with aspects of the present disclosure. A facial embedding, as used herein, may refer to an encrypted vector that is generated from a facial image and that represents facial features of that face. The facial features are captured in the facial embedding. In embodiments, the facial embeddings stored in the facial embeddings database may include masked facial embeddings, simulated masked facial embeddings, unmasked portion facial embeddings, original unmasked facial embeddings, and unmasked facial embeddings. In embodiments, facial embeddings (e.g., including masked facial embeddings, simulated masked facial embeddings, unmasked portion facial embeddings, original unmasked facial embeddings, and unmasked facial embeddings) may be generated using facial embeddings generation architectures such as FaceNet.

In embodiments, masked facial embeddings may include at least one facial embedding that is generated from an image of a masked face. In this sense, the masked facial embedding may represent a masked face. In embodiments, simulated masked facial embeddings may include at least one facial embedding that is generated from an image that simulates a masked face. For example, as will be discussed in more detail below, an unmasked face in an image may be modified to simulate a masked face (e.g., by superimposing different types, shapes, styles, colors, textures, etc. of masks overlaid on the unmasked face) and a facial embedding may be generated from the simulated masked face. In this sense, the simulated masked facial embedding may represent a simulated masked face.

In embodiments, unmasked portion facial embeddings may include at least one facial embedding that is generated from the unmasked portion of a masked face in an image. For example, as will be discussed in more detail below, the unmasked portion of a masked face may be extracted from an image and a facial embedding may be generated from the extracted unmasked portion. In this sense, the unmasked portion facial embedding may represent an unmasked portion of a masked face. As used herein, an unmasked portion may refer to the portion of the face that is not covered by a mask, or may refer to the upper portion of a masked face.

In embodiments, original unmasked facial embeddings may include at least one facial embedding that is generated from an original unmasked face. For example, original, unmodified (e.g., by unmasked portion extraction, simulated masking, or face restoration) unmasked faces in an image may be used to generate original unmasked facial embeddings. In this sense, an original unmasked facial embedding may represent an original unmasked face.

In embodiments, unmasked facial embeddings may include at least one facial embedding that is generated from an image including an unmasked face, where the unmasked face represents a restored face. For example, as will be discussed in more detail below, a masked portion of a masked face may be detected, and the masked portion may be replaced with the missing components covered by the mask (e.g., nose, mouth, chin, cheeks, etc.) to generate a restored unmasked face. A facial embedding may be generated from the restore unmasked face. In this sense, an unmasked facial embedding may represent a restored unmasked face.

Database augmentation engine 150 may be configured to provide functionality to augment a facial database by executing a simulated facial indexing algorithm on images in the facial database. In particular, database augmentation engine 150 is configured to simulate masking of unmasked faces in the facial database and to generate facial embeddings from the simulated masked faces for storage in database 113. In addition, in some embodiments, database augmentation engine 150 is configured to extract the unmasked portion from simulated masked faces and to generate facial embeddings from the unmasked portions for storage in database 113. These enhanced techniques for facial recognition and mask detection are particularly useful in that a system implemented in accordance with the features of the present disclosure is able to improve masked face recognition by using, during operations, real-time or near real-time, the facial embeddings generated by the database augmentation engine 150 and stored in the facial embeddings database of database 113.

Figure 2:
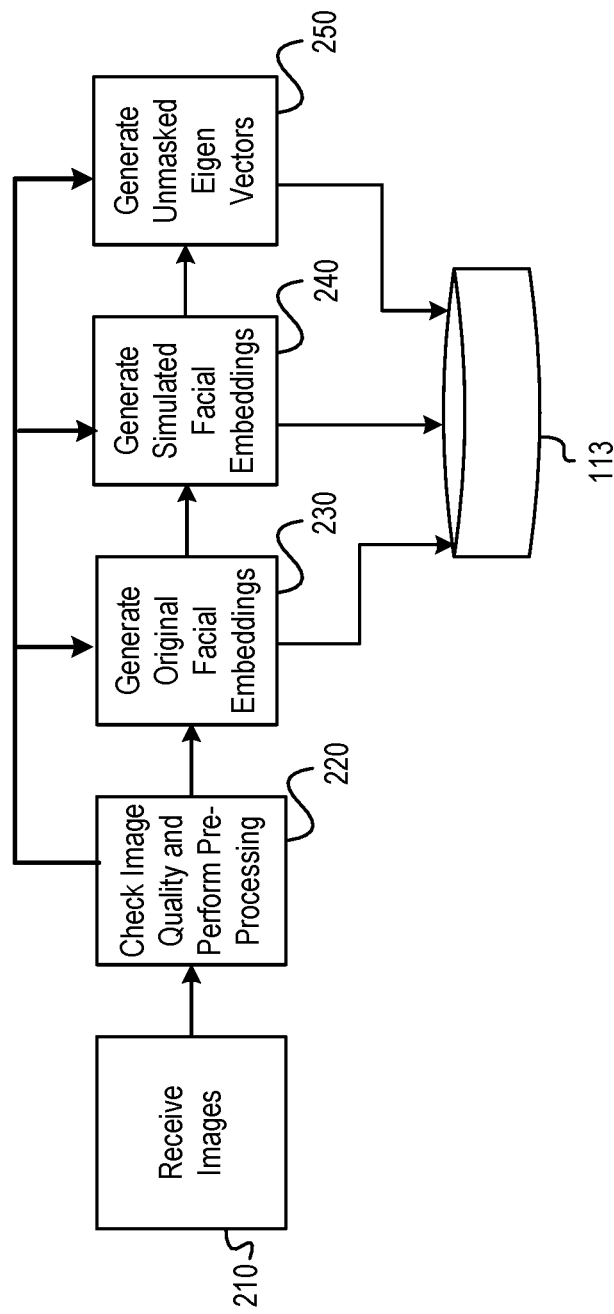
FIG. 2 is a block diagram illustrating database augmentation functionality in accordance with embodiments of the present disclosure.

Referring to FIG. 2, a block diagram illustrating database augmentation functionality provided by a system configured in accordance with embodiments of the present disclosure is shown. It is noted that the functionality described with respect to FIG. 2 may be provided by a system such as system 100, and in particular database augmentation engine 150, described above. As shown in FIG. 2, at block 210, an image or images may be received (e.g., by database augmentation engine 150 from image input 130 as illustrated in FIG. 1, or from database 113, which may be a database to be augmented). The received images may be images stored in a database to be augmented in accordance with aspects of the present disclosure. The received images may be images including faces and the faces may be unmasked. In examples, the faces may represent faces of employees, users, persons, etc. In some cases, the database may be an authenticated database and the persons in the database may be authorized or authenticated persons. For example, the database may be an employee database and the faces in the database may be of employees who are authorized to access company resources (e.g., a building, IT systems, etc.).

At block 220, quality checking and pre-processing of the received image may be performed. For example, image alignment may be performed to ensure the image is properly aligned and at the right orientation. In some embodiments, the image may be resealed and/or resized. In some aspects, the image may be smoothed and/or further enhancements may be performed on the image. The resulting image is a pre-processed image that may contain an unmasked face. In some aspects, the output from block 220 may be provided to blocks 230, 240, and/or 250.

At block 230, a facial embedding may be generated from the unmasked face in the image pre-processed at block 220 and stored in database 113 as an original unmasked facial embedding. In some embodiments, the original unmasked facial embedding may be generated by applying the image containing the unmasked face to a visual image analyzer such as a neural network, and in some embodiments, in particular, a convolutional neural network (CNN) architecture, to generate a facial embedding of the original unmasked face. The resulting original unmasked facial embedding may be stored in database 113.

At block 240, simulated masked facial embeddings may be generated. In embodiments, generating the simulated masked facial embeddings may include obtaining the original image of the unmasked face, and then processing the image to identify facial key points and facial landmarks of the unmasked face. Based on the identified facial landmarks, database augmentation engine 150 may determine where a simulated mask may be positioned upon the unmasked face. In embodiments, the simulated mask may be positioned upon the unmasked face by overlaying a simulated mask on the unmasked face, such as over the mouth and nose, as a mask typically works in this manner, to generate a masked face, albeit a simulated masked face since the original face is unmasked. A simulated mask as used herein may refer to, e.g., a digital image of a mask.

After the simulated masking of the unmasked face, a simulated masked facial embedding of the simulated masked face may be generated. In some embodiments, generating the simulated masked facial embedding of the simulated masked face may include applying the modified image containing the simulated masked face to a visual image analyzer, such as the CNN architecture used in step 230, to generate the simulated masked facial embedding of the simulated masked face. The resulting simulated masked facial embedding may be stored in database 113.

In some embodiments, a plurality of simulated masked faces may be generated by simulating different characteristics of the simulated masks, and generating a simulated mask for each of the different characteristics. For example, simulated faces in which an unmasked face is masked using different types, shapes, styles, colors, textures, etc., of masks may be generated. In some embodiments, a simulated masked facial embedding may be generated for each of the various characteristics of the simulated mask. In this manner, a large set of simulated masked facial embeddings may be generated for each simulated masked face representing a broad range of masks which may increase the probability of finding a match during operations.

At block 250, eigenvectors of the unmasked portions of the simulated masked faces may be generated. In embodiments, generating eigenvectors of the unmasked portions of the simulated masked faces may include obtaining the simulated masked face, such as the simulated masked face generated at step 240, and identifying facial key points and facial landmarks associated with the unmasked portion of the masked face. Based on the identified facial landmarks, the unmasked portion may be identified, as the facial landmarks may facilitate identifying portions of the face that may not be masked (e.g., eyes, forehead, etc.). In some embodiments, identifying the unmasked portion of the masked face may include identifying the masked portion (which may be known based on the simulated masking performed at step 240) and extracting the unmasked portion. After the unmasked portion of the masked face is determined, a representation may be obtained using a deep joint semantic representation method. To obtain a deep joint semantic representation, an existing convolutional neural network (e.g., a visual geometry group (VGG) architecture) may be refined or fine-tuned using the unmasked portion of the masked face, and the result may be used as a feature extractor. Afterwards, handcrafted features, such as landmark positions, location of eyes, ears, shape-based features, etc. may be extracted. The features from the convolutional neural network and the handcrafted features may then be concatenated to obtain a deep joint semantic representation for the unmasked face. In embodiments, this concatenated representation may be provided as an unmasked portion facial embedding, and may be used as output.

As will be appreciated, the steps illustrated by the blocks of FIG. 2 may provide functionality that enhances and augments the database of unmasked faces by generating facial embeddings of the original unmasked faces, simulated masking the original unmasked faces and generating facial embeddings of the simulated masked faces, and by generating eigenvectors of the unmasked portions of the simulated masked faces.

Referring back to FIG. 1, server 110 may also include mask detection engine 160. Mask detection engine 160 may be configured to provide functionality to detect a masked face. In some aspects, the functionality of mask detection engine 160 may include detecting whether an image includes a masked face (e.g., a face with a mask on) and, where a masked face is detected, and detecting the mask (e.g., location, coordinates, pixels, etc. of the mask within the masked face). In embodiments, mask detection functionality may provide detecting a masked face within the input image and generating a bounding box around the masked face. This bounding box generation will be discussed in more detail with respect to masked face recognition functionality illustrated in FIG. 3.

Figure 4:
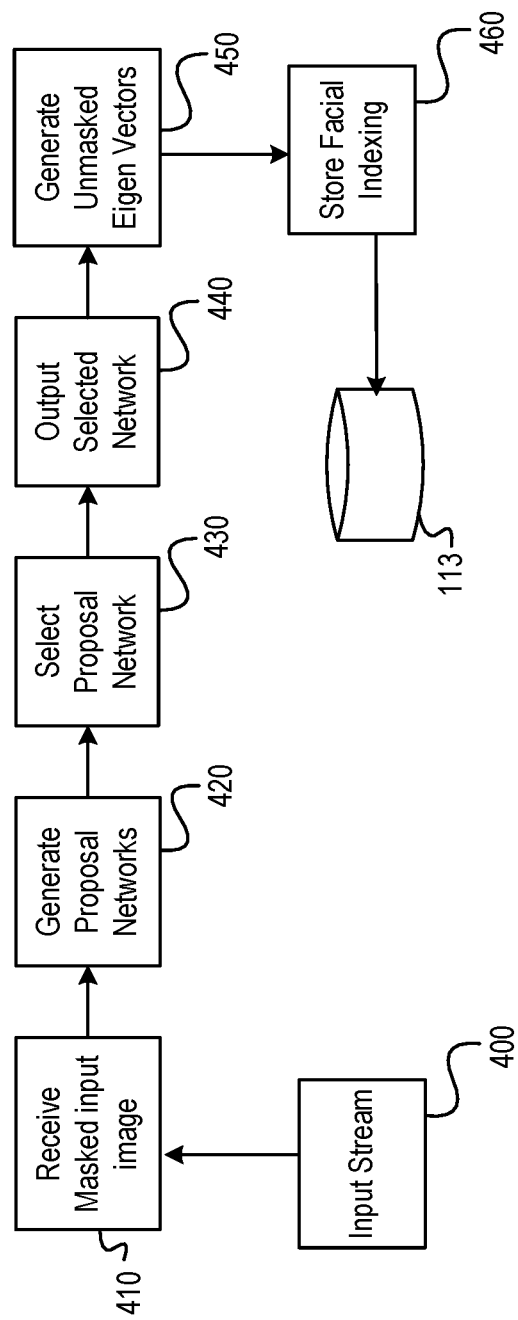
FIG. 4 is a block diagram illustrating masked face detection functionality in accordance with embodiments of the present disclosure.

Referring to FIG. 4, a block diagram illustrating masked face detection functionality provided by a system configured in accordance with embodiments of the present disclosure is shown. It is noted that the functionality illustrated with respect to FIG. 4 may be referred to as a masked face detection algorithm in that it sets forth steps and functions that may be performed to achieve masked face detection. In that sense, it should be appreciated that the functionality described with respect to FIG. 4 provides a technical means for performing masked face detection. Additionally, it is noted that the functionality described with respect to FIG. 4 may be provided by a system such as system 100, and in particular mask detection engine 160, described above. The masked face detection and mask detection functionality of mask detection engine 160 may be leveraged to provide mask detection or may be used as a stage in masked face recognition processes, such as will be described in more detail below. In embodiments, masked face detection may include detecting a masked face and then generating a bounding box around the masked face. In aspects, a multitask cascaded CNN architecture may be used for masked face detection.

As shown in FIG. 4, at block 410, an image or images may be received. In embodiments, the received images may be images that may include a face, which may be masked or unmasked. For example, at block 410, a masked input image may be received. The received masked input image may be provide by an input stream (e.g., input stream 400), such as a video feed, an image feed, an image or video database, etc. At block 420, which may represent a first step of the multitask cascaded CNN architecture, mask detection engine 160 may generate candidate bounding boxes by generating a number of proposals (e.g., proposed bounding boxes) for boxes that may contain a masked face. At block 430, which may represent a second step of the multitask cascaded CNN architecture, mask detection engine 160 may refine the number of candidate bounding boxes by iterating through the proposals, using a deep-learning based bounding box regression technique, until a candidate bounding box is selected, the selected box representing a masked face.

At block 440, which may represent a third step of the multitask cascaded CNN architecture, mask detection engine 160 may learn key facial points and landmarks in order to generate a bounding box. In particular, mask detection engine 160 may learn upper face landmarks (e.g., eye region, eyebrow region, forehead region) in order to generate the bounding box and overlay the bounding box onto the masked face, and to output the box bounded image. At block 450, Eigen value vectors are generated from the bounded boxed masked face and block 460, the generated Eigen value vectors are stored in the facial embeddings database 113.9

In some embodiments, masked face functionality in accordance with the features provided by mask detection engine 160 may allow a system to provide face mask alerts. For example, in some embodiments, when an image is determined to include an unmasked face (e.g., by determining that the image does not include a masked face), a system implemented in accordance with the features discussed herein may perform face recognition (e.g., by executing face recognition algorithms) of the unmasked face to determine the identity of the user or person represented by the unmasked face. In some embodiments, if an alerting condition is determined to exist (e.g., the identified user may be obligated to wear a mask), an alert may be generated and send to the identified user (e.g., to a mobile device of the user, or to a device associated with a person charged with ensuring that the user wears a mask).

Figure 3:
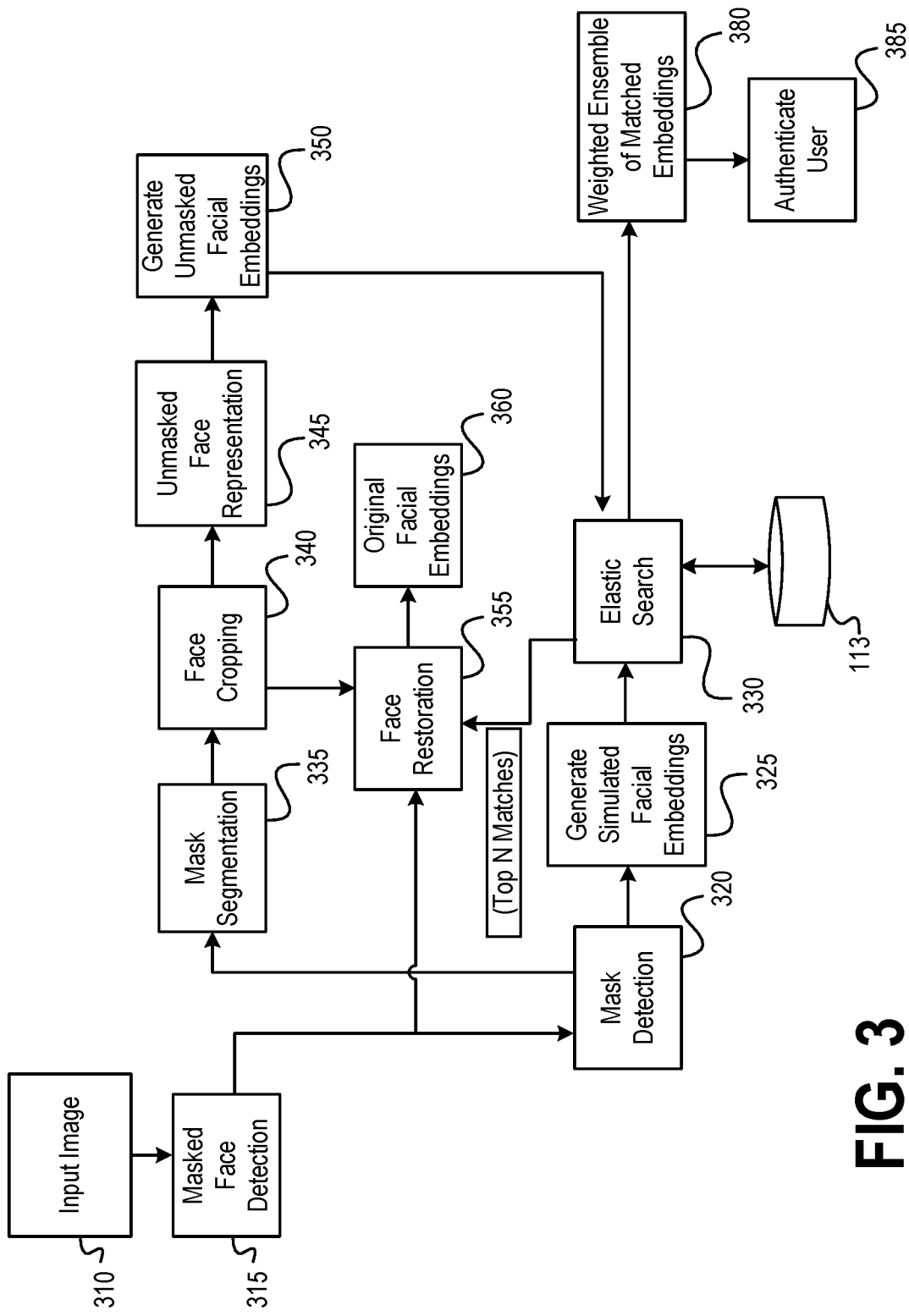
FIG. 3 is a block diagram illustrating masked face recognition functionality in accordance with embodiments of the present disclosure.

Referring back to FIG. 1, server 110 may also include masked face restoration and recognition engine 170. Masked face restoration and recognition engine 170 may be configured to provide functionality to recognize masked faces, without the need to remove the mask. Referring to FIG. 3, a block diagram illustrating masked face recognition functionality provided by a system configured in accordance with embodiments of the present disclosure is shown. It is noted that the functionality described with respect to FIG. 3 may be provided by a system such as system 100, and in particular masked face restoration and recognition engine 170 described above. In embodiments, this masked face recognition functionality may be a multi-layered approach which may include two or more of: 1) matching the masked face to a masked face stored in a database (e.g., database 113), 2) comparing the unmasked portion of the masked face to stored faces in a database to identify any matches, and 3) executing face restoration in which the masked portion is reconstructed to generate an unmasked representation which may then be matched against unmasked faces in the database. The result of this layered analysis may be combined to provide a more effective and efficient masked face recognition technique.

What follows is a discussion of the advantageous multi-stage approach to masked face recognition described herein. In a first stage of the multi-stage approach to masked face recognition described herein, simulated embeddings representing matched masked faces are obtained from the facial embeddings database. In particular, as shown in FIG. 3, at block 310, an image or images may be received. In embodiments, the received images may be images that may include a face, which may be masked or unmasked. At block 315, masked face detection may be performed. In embodiments, masked face detection at block 315 may be implemented as the masked face detection functionality described above with respect to FIG. 4. In aspects, the output of block 315 may be a bounding box around and containing a face with a mask on. For the sake of brevity, the specific algorithm for masked face detection is not repeated herein, but reference is made to the discussion with respect to FIG. 4 above. In aspects, the output of block 315 may be a bounding box around and containing a face with a mask on. The output of block 315 may be provided as input to block 320.

At block 320, a mask of the masked face may be detected. In embodiments, detecting the mask may include detecting the location, coordinates, pixels, etc. of the mask within the masked face. In embodiments, detecting the mask may include employing a neural network to detect the face mask and put a bounding box around the mask. Once the mask is detected, simulated masked facial embeddings may be generated at block 325. In some embodiments, generating the simulated masked facial embedding of the masked face may include applying the masked face to a visual image analyzer, such as a CNN architecture, to generate the simulated masked facial embedding of the masked face. The generated simulated masked facial embedding of the masked face may then be input into a search algorithm (e.g., the elastic search at block 330) in order to determine simulated masked facial embeddings stored in the facial embeddings database (e.g., database 113) that match the generated simulated masked facial embedding of the masked face. In some embodiments, the search may yield the K nearest neighbors. As will be discussed in more detail below, the matched simulated masked facial embeddings may be fed into a feedback loop in order to refine a face restoration process and find a matching identify of the masked face.

Figure 5:
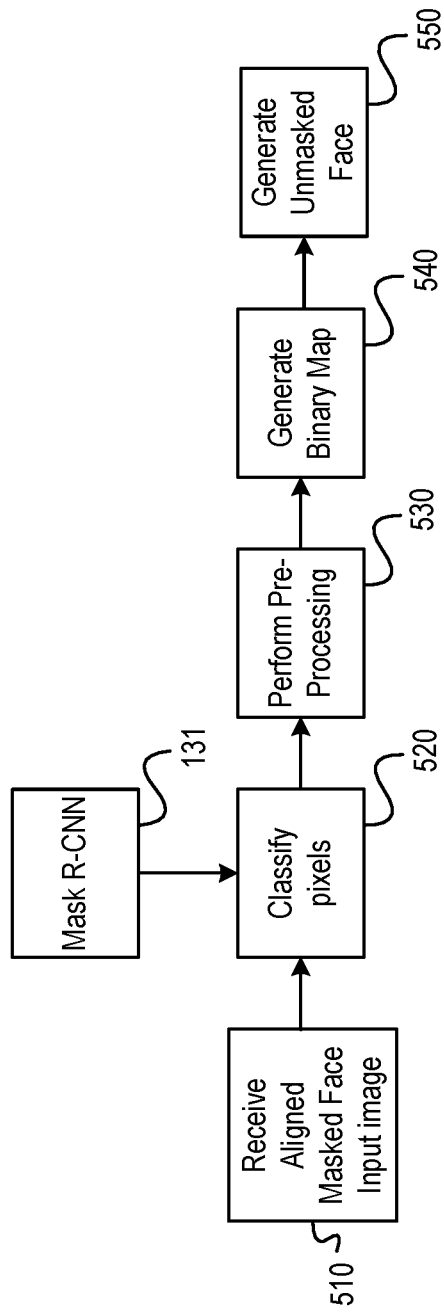
FIG. 5 is a block diagram illustrating mask segmentation functionality in accordance with embodiments of the present disclosure.

In a second stage of the multi-stage approach to masked face recognition described herein, unmasked portion facial embeddings representing matches to the unmasked portion of the masked face are obtained from the facial embeddings database. It is noted that the functionality described with respect to obtaining unmasked portion facial embeddings may be referred to herein as an unmasked portion detection and matching algorithm in that it sets forth steps and functions that may be performed to achieve unmasked portion detection. In that sense, it should be appreciated that the functionality described with respect to obtaining unmasked portion facial embeddings provides a technical means for performing unmasked portion matching. In particular, as shown in FIG. 3, the output of the mask detection block 320, which may be an image of the masked face with a bounding box around the mask, may be provided to block 335 for mask segmentation. The goal of the mask segmentation is to identify the portion of the image that represents the mask and as a corollary the unmasked portion of the masked face. FIG. 5 is a block diagram illustrating mask segmentation functionality provided by a system configured in accordance with embodiments of the present disclosure. In embodiments, mask segmentation may include executing a semantic segmentation algorithm. At block 510, an input image is received. The input image may be the output of the mask detection block 320, which may be an image of the masked face with a bounding box around the mask. In some embodiments, this input image may represent an aligned masked face image. For example, at block 510, an aligned masked face input image may be received. At block 520, the semantic segmentation algorithm may apply a classifier to the masked face image that may classify each pixel of the masked face image into one of two classes: mask and unmask. In some embodiments, a mask CNN 131 may be used to segment the unmasked face region. In embodiments, at block 530, the segmented image may be put through a post-processor for dilation and/or erosion which generates a smoother image of the masked and unmasked portions. At block 540, a binary map of the masked face image may be generated as a result of the classifier, the binary map of the masked face image representing the masked portion of the masked face, as well as the unmasked portion of the masked face. The resulting binary map may be provided as an output of block 335, and may be provided as an input to block 340 for face cropping. In some alternative embodiments, at block 550, and unmasked face may be generated based on the binary map, and the unmasked face may be provided as output of block 335.

Referring back to FIG. 3, at block 340, face cropping to extract the unmasked portion of the masked face may be performed. In embodiments, the binary map may be used to determine the masked portion and the unmasked portion of the masked face, which facilitates cropping of the unmasked portion of the masked face to generate a unmasked portion representation 345 of the masked face. In embodiments, the binary map may be applied to the masked face image (e.g., the binary map may be overlaid on the masked image) which serves to determine the portion of the masked face covered by the mask and the portion of the face not covered by the mask. The portion of the face not covered by the mask may be provided as the unmasked portion representation. The unmasked portion representation 345 may be provided to block 350 as input.

Figure 6:
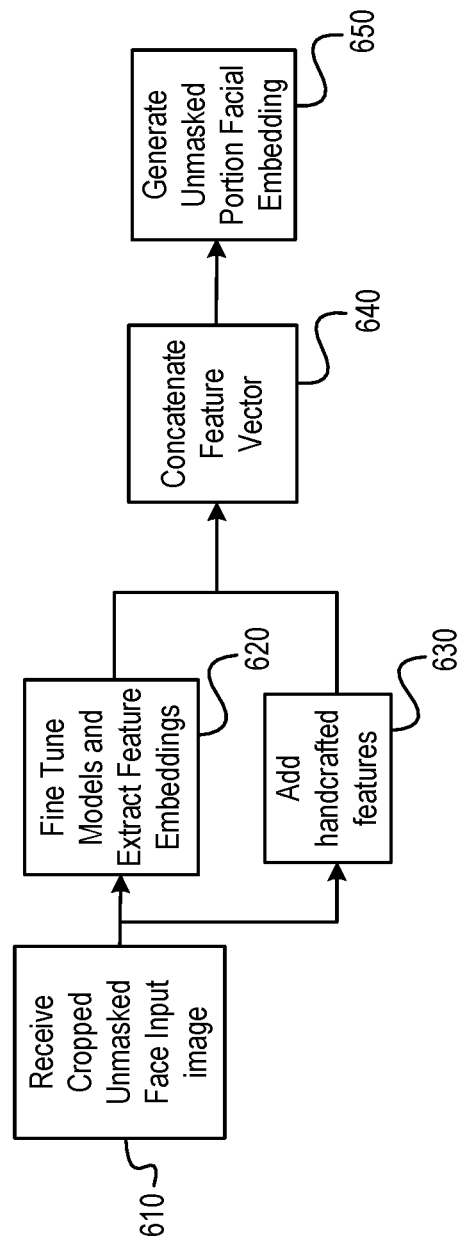
FIG. 6 is a block diagram illustrating functionality for generating unmasked portion facial embeddings in accordance with embodiments of the present disclosure.

At block 350, unmasked portion facial embeddings may be generated for the unmasked portion representation 345 of the masked face. In embodiments, generating unmasked portion facial embeddings may include applying a deep joint semantic representation algorithm. FIG. 6 is a block diagram illustrating functionality for generating unmasked portion facial embeddings provided by a system configured in accordance with embodiments of the present disclosure. As noted above, in accordance with the present disclosure, a deep joint semantic representation algorithm may be employed to generate the unmasked portion facial embeddings. It is noted that traditional systems for facial embeddings generation are trained on image datasets that do not specifically focus on upper region of the face and the features used in the approach described herein. In the advantageous approach for unmasked portion facial embedding generation disclosed herein, CNN pre-trained models are fine-tuned on masked face data and hand-crafted features that capture the landmark positions of the upper face, face contour, location of ears, etc., and are added to the results of the fine-tuned models. For example, at block 610, an input image is received. The input image may be the unmasked portion representation 345 outputted by the face cropping block 340, (which may be determined by applying the binary map generated at block 540 of FIG. 5 to the masked face image). For example, at block 610, a cropped unmasked face input image may be received. At block 620, pre-trained CNN models are fine-tuned, and feature embeddings are extracted from the unmasked portion representation. At block 630, handcrafted features are extracted from the unmasked portion representation to generate facial embeddings. In embodiments, the handcrafted features may include landmark positions of the upper face, face contour using shape-based models, shape and location of ears in an invariant way, etc.

At block 640, the embeddings from the handcrafted features are concatenated from the embeddings generated by the fine-tuned CNN models to generate unmasked portion facial embedding 650. The unmasked portion facial embedding 650 may represent an unmasked portion facial embedding of the unmasked portion representation of the masked face. In embodiments, and referring back to FIG. 3, the generated unmasked portion facial embedding of the masked face may then be input into a search algorithm (e.g., the elastic search at block 330) in order to determine unmasked portion facial embeddings stored in the facial embeddings database (e.g., database 113) that match the generated unmasked portion facial embedding of the masked face. In some embodiments, the search may yield the K nearest neighbors. As will be discussed in more detail below, the matched unmasked portion facial embeddings may be fed into a feedback loop in order to refine a face restoration process and find a matching identify of the masked face.

In the third stage of the multi-stage approach to masked face recognition described herein, face restoration, or unmasking, of the masked face may be performed. In aspects, face restoration includes replacing the masked portion of the masked face with the missing facial components to generate a reconstructed face image that represents an unmasked face. It is noted that face restoration and or unmasking is a very challenging process as it requires generating semantically new pixels for the missing components of the face (e.g., nose, mouth, cheeks, chin etc.) which are occluded by the mask, and which the system has not seen before, and because the occluded region of the face typically contains large appearance variations. The present disclosure provides an advantageous technique for handling face restoration, as will be discussed.

In aspects, as shown in FIG. 3, the output of the mask face detection block 315, which may be an image of the masked face with a bounding box around the masked face, may be provided to block 355 for face restoration. The goal of face restoration is to reconstruct the masked portions of the masked face such that the resulting image represents an unmasked face. In a sense, face restoration unmasks the masked face. In embodiments, face restoration may be part of a feedback loop in which the results of the first stage and the second stage are initially used to refine the face restoration process, which results in a more accurate and efficient process for masked face identification. In some embodiments, the results of the first, second, and even third stages may be used to further refine the face restoration process. For example, at block 355, face restoration is performed on the masked face identified at block 315, using the matched simulated masked facial embeddings and the matched unmasked portion facial embeddings from the first and second stage, as described above. The face restoration of embodiments may be performed using a deep generative adversarial network (GAN) algorithm that employs a two-stage autoencoder approach, as will be described below. The output of the face restoration block 355 may be used to generate original unmasked facial embeddings 360. In embodiments, original unmasked facial embeddings 360 generated from unmasked faces restored by face restoration block 355 may be used to search, at block 330, for potentially matching original unmasked face embeddings the facial embeddings database (e.g., database 113). The matched original unmasked face embeddings are used by face restoration block 355 to refine the face restoration process. The refined resulting unmasked facial embeddings are then combined, at block 380, with the matched simulated masked facial embeddings and the matched unmasked portion facial embeddings to generate a weighted ensemble of matched facial embeddings, which are then used to identify and authenticate a user represented by the masked face (e.g., at block 385). In embodiments, the weighted ensemble of matched facial embeddings may be generated by obtaining probability votes for the results of each of the matched simulated masked facial embeddings, the matched unmasked portion facial embeddings, and the matched unmasked facial embeddings, based on a most probable match for each of the matched embeddings. In a situation where there is a draw in the probability vote, a confidence score for the top x results from all facial embeddings is obtained. The result with the highest average confidence value is selected as the most probable match.

Figure 7:
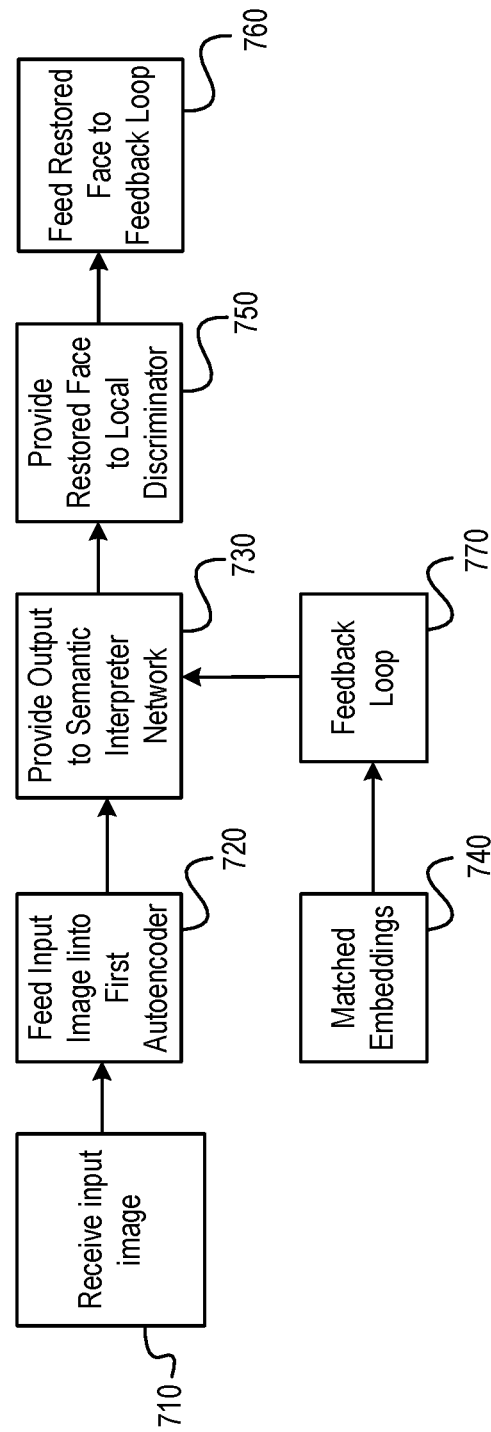
FIG. 7 is a block diagram illustrating face restoration for masked face recognition functionality in accordance with embodiments of the present disclosure.

FIG. 7 is a block diagram illustrating face restoration for masked face recognition functionality provided by a system configured in accordance with embodiments of the present disclosure. It is noted that the functionality described with respect to FIG. 7 may be referred to herein as a face restoration algorithm in that it sets forth steps and functions that may be performed to achieve face restoration. In that sense, it should be appreciated that the functionality described with respect to FIG. 7 provides a technical means for performing face restoration. At block 710, an input image is received. The input image may be the output of the masked face detection block 315, which may be an image of the masked face with a bounding box around the masked face. At block 720, the input image may be fed into first autoencoder 720, which may be configured with an encoder that captures the relations between unmasked and masked regions of the masked face, and a decoder that is configured to generate content, such as a reconstructed image. An original unmasked embedding may be generated from the reconstructed image provided by first autoencoder 720. The original unmasked embedding generated by first autoencoder 720 may represent an unmasked face representing a reconstruction of the masked face, but which is not necessarily refined and may represent a first attempt at learning the shape of the face to provide global coherency.

The output of first autoencoder 720 may be provided to semantic interpreter network 730. In addition, in embodiments, semantic interpreter network 730 may also receive as input an image stack of matched images from the first and second stages of the multi-stage masked face recognition process described herein using the feedback loop 770. The input from feedback loop 770 helps identify the very granular features of the area of interest, such as age, gender, etc. Specifically, semantic interpreter network 730 may receive, at block 740 the matched simulated masked facial embeddings that were identified in the first stage, and the matched unmasked portion facial embeddings that were identified in the second stage discussed above. Semantic interpreter network 730 may be configured to use the matched original unmasked facial embeddings provided by first autoencoder 720, the first stage output, and the second stage out to further enhance the restored face based on the matched images.

In embodiments, at block 750, the restored face generated by semantic interpreter network 730 may be provided to a local discriminator, which may be configured to provide feedback to semantic interpreter network 730 as to whether the restored face is fake or real. By receiving this feedback from the local discriminator, semantic interpreter network 730 may try to learn the image representing the restored face in different ways, which may be significantly close to a real life image. This feedback from the local discriminator helps reduce the overall loss and enables the semantic interpreter network 730 to restore the features of the face, which are similar to real life features.

At block 760, the restored face, which may be outputted from semantic interpreter network 730, is used to generate the original facial embeddings, which may then be matched with a corresponding original facial embedding stored in the database to arrive at probable matches using K nearest neighbors. The results thus obtained along with results of the first stage and the second stage may then fed to a weighted ensemble model (e.g., weighted ensemble model 380 of FIG. 3).

Figure 8:
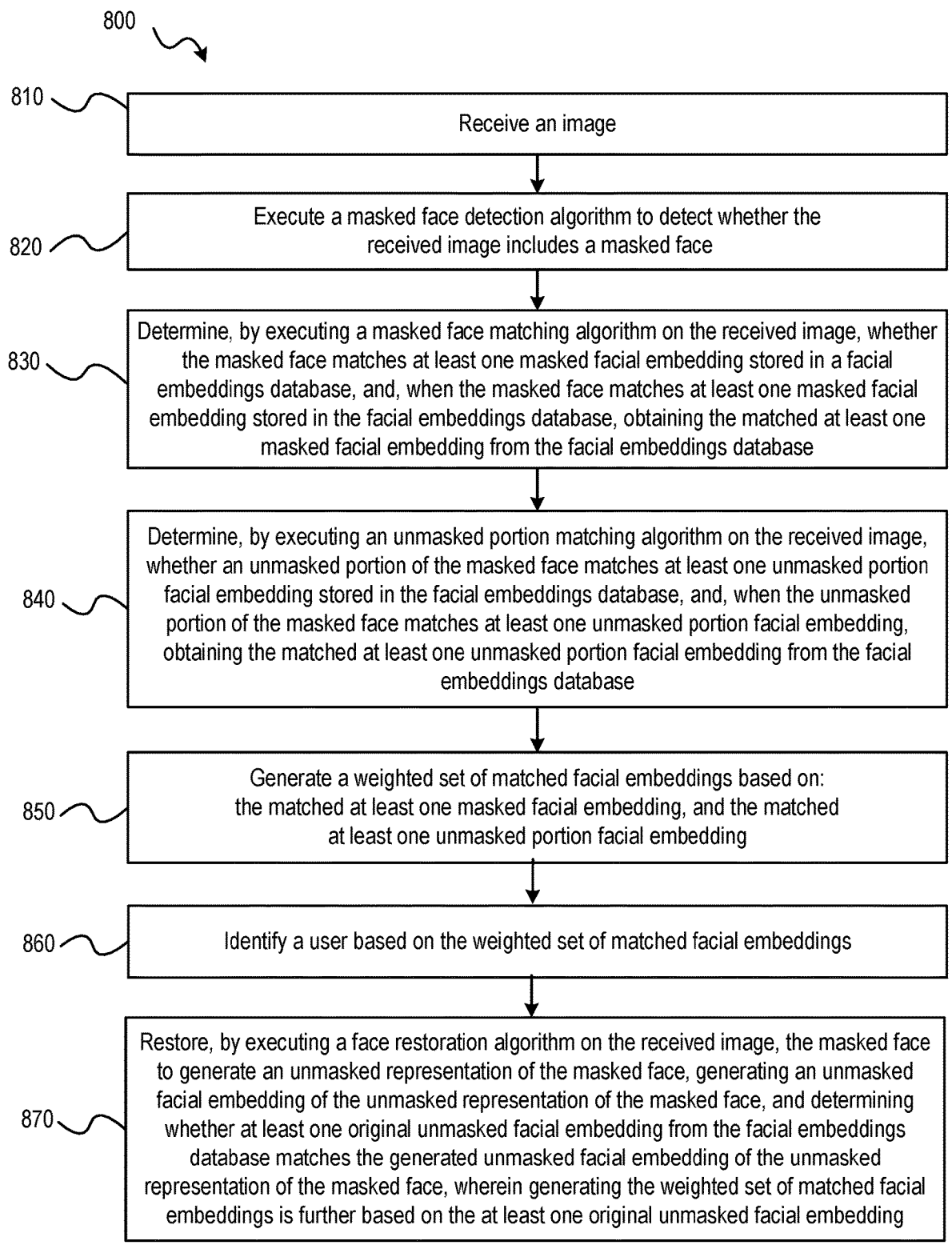
FIG. 8 is a flow diagram of a method for providing masked face recognition in accordance with embodiments of the present disclosure.

Referring to FIG. 8, a flow diagram of a method for providing masked face recognition in accordance with embodiments of the present disclosure is shown. In aspects, the operations of the method 800 may be stored as instructions that, when executed by one or more processors (e.g., the one or more processors 111 of FIG. 1), cause the one or more processors to perform the steps of the method. In aspects, the method 800 may be performed by a device, such as server 110 of FIG. 1.

At step 810, the method 800 includes receiving, by a computing device (e.g., server 110) an image. In embodiments, the image may be received from an image database, a streaming service, a video stream, an image stream, etc., and may include a face which may be masked or unmasked. At step 820, the method includes executing a masked face detection algorithm to detect whether the received image includes a masked face.

In some embodiments, in accordance with a determination that the received image includes an unmasked face, the method includes executing an unmasked face recognition algorithm to identify a user represented by the unmasked face, determining whether the identity of the identified user matches an identify for which an alert condition is met, and in accordance with a determination that the identity of the identified user matches an identify for which an alert condition is met, generating an alert indicating that the identified user is unmasked and causing the alert to be send to the identified user.

In accordance with a determination that the received image includes a masked face, at step 830, the method includes determining, by executing a masked face matching algorithm on the received image, whether the masked face matches at least one masked facial embedding stored in a facial embeddings database, and, when the masked face matches at least one masked facial embedding stored in the facial embeddings database, obtaining the matched at least one masked facial embedding from the facial embeddings database.

In some embodiments, the at least one masked facial embedding stored in the facial embeddings database is a simulated masked facial embedding. In some embodiments, the simulated masked facial embedding stored in the facial embeddings database is generated by obtaining at least one image of an unmasked face, obtaining an original unmasked facial embedding of the unmasked face and at least one facial embedding of a simulated mask, and combining the original unmasked facial embedding of the unmasked face and the at least one facial embedding of the simulated mask to generate the simulated masked facial embedding. In some embodiments, the simulated masked facial embedding represents a simulated masking of the unmasked face. In some embodiments, the simulated mask may represent simulated masks of at least one of different colors, styles, shapes, and textures.

In some embodiments, in accordance with a determination that the received image includes an unmasked face, the method 800 includes executing an unmasked face recognition algorithm to identify a user represented by the unmasked face, and determining whether the identity of the identified user matches an identify for which an alert condition is met. In accordance with a determination that the identity of the identified user matches an identify for which an alert condition is met, the method 800 includes generating an alert, the alert indicating that the identified user is unmasked, and causing the alert to be send to the identified user.

At step 840, the method 800 includes determining, by executing an unmasked portion matching algorithm on the received image, whether an unmasked portion of the masked face matches at least one unmasked portion facial embedding stored in the facial embeddings database, and, when the unmasked portion of the masked face matches at least one unmasked portion facial embedding, obtaining the matched at least one unmasked portion facial embedding from the facial embeddings database.

In some embodiments, determining whether the unmasked portion of the masked face matches at least one unmasked portion facial embedding stored in the facial embeddings database includes executing a semantic segmentation algorithm against the image of the masked face to identify a masked portion of the unmasked face, extracting the unmasked portion of the masked face based on the semantic segmentation, generating the facial embedding of the unmasked portion of the masked face, and comparing the generated facial embedding of the unmasked portion with unmasked portion facial embeddings stored in the facial embeddings database to identify matching unmasked portion facial embeddings.

At step 850, the method 800 includes generating a weighted set of matched facial embeddings based on the matched masked facial embedding and the matched unmasked portion facial embedding. At step 860, the method 800 includes identifying a user based on the weighted set of matched facial embeddings, where the user may be associated with the matched masked facial embedding stored in the facial embeddings database.

In alternative or additional embodiments, as shown at block 870, the method 800 includes restoring, by executing a face restoration algorithm on the received image, the masked face to generate an unmasked representation of the masked face, generating an unmasked facial embedding of the unmasked representation of the masked face, and determining whether at least one original unmasked facial embedding from the facial embeddings database matches the generated unmasked facial embedding of the unmasked representation of the masked face. In embodiments, generating the weighted set of matched facial embeddings is further based on the at least one original unmasked facial embedding.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-8) may comprise processors, electronics devices, hardware devices, electronics components, logical circuits, memories, software codes, firmware codes, etc., or any combination thereof. In addition, features discussed herein relating to FIGS. 1-8 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for recognizing a masked face, the method comprising:
    receiving, by a computing device, an image;
    executing a masked face detection algorithm to detect whether the received image includes a masked face;
    in accordance with a determination that the received image includes a masked face:
        determining, by executing a masked face matching algorithm on the received image, whether the masked face matches at least one masked facial embedding stored in a facial embeddings database, and, when the masked face matches at least one masked facial embedding stored in the facial embeddings database, obtaining the matched at least one masked facial embedding from the facial embeddings database;
        determining, by executing an unmasked portion matching algorithm on the received image, whether an unmasked portion of the masked face matches at least one unmasked portion facial embedding stored in the facial embeddings database, and, when the unmasked portion of the masked face matches at least one unmasked portion facial embedding, obtaining the matched at least one unmasked portion facial embedding from the facial embeddings database;
    generating a weighted set of matched facial embeddings based on: the matched at least one masked facial embedding, and the matched at least one unmasked portion facial embedding; and
    identifying a user based on the weighted set of matched facial embeddings,
        the user associated with the at least one masked facial embedding stored in the facial embeddings database.

2. The method of claim 1, further comprising:
    restoring, by executing a face restoration algorithm on the received image, the masked face to generate an unmasked representation of the masked face, generating an unmasked facial embedding of the unmasked representation of the masked face, and determining whether at least one original unmasked facial embedding from the facial embeddings database matches the generated unmasked facial embedding of the unmasked representation of the masked face, and
    wherein the generating the weighted set of matched facial embeddings is further based on the at least one original unmasked facial embedding.

3. The method of claim 2, wherein the restoring the masked face to generate the unmasked representation of the masked face includes:
    executing a deep generative adversarial network algorithm against the masked face image to generate a set of candidate facial embeddings of unmasked representations of the masked face;
    identifying facial embeddings in the facial embeddings database matching the candidate facial embeddings to generate a set of matched candidate unmasked facial embeddings;
    applying the set of matched candidate unmasked facial embeddings to a feedback loop to refine the set of candidate facial embeddings of the unmasked representations of the masked face based on the set of matched candidate unmasked facial embeddings; and
    identifying a matching facial embedding of an unmasked representation of the masked face based on the refined set of candidate facial embeddings.

4. The method of claim 1, further comprising:
    in accordance with a determination that the received image includes an unmasked face:
        executing an unmasked face recognition algorithm to identify a user represented by the unmasked face;
        determining whether the identity of the identified user matches an identify for which an alert condition is met;
        in accordance with a determination that the identity of the identified user matches an identify for which an alert condition is met:
            generating an alert, the alert indicating that the identified user is unmasked; and
            causing, the alert to be sent to the identified user.

5. The method of claim 1, wherein the at least one masked facial embedding stored in the facial embeddings database is a simulated masked facial embedding.

6. The method of claim 5, wherein the simulated masked facial embedding stored in the facial embeddings database is generated by:
   obtaining at least one image of an unmasked face;
   obtaining an original unmasked facial embedding of the unmasked face and at least one facial embedding of a simulated mask;
   combining the original unmasked facial embedding of the unmasked face and the at least one facial embedding of the simulated mask to generate the simulated masked facial embedding, wherein the simulated masked facial embedding represents a simulated masking of the unmasked face; and
   storing the simulated masked facial embedding in the facial embeddings database.

7. The method of claim 6, wherein the facial embedding of the simulated mask represents simulated masks of at least one of different colors, styles, shapes, and textures.

8. The method of claim 1, wherein the determining whether the masked face matches at least one masked facial embedding stored in the facial embeddings database includes:
   generating the facial embedding of the masked face; and
   comparing the generated facial embedding of the masked face with masked facial embeddings stored in the facial embeddings database to identify matching masked facial embeddings.

9. The method of claim 1, wherein the determining whether the unmasked portion of the masked face matches at least one unmasked portion facial embedding stored in the facial embeddings database includes:
   executing a semantic segmentation algorithm against the image of the masked face to identify a masked portion of the unmasked face;
   extracting the unmasked portion of the masked face based on the semantic segmentation;
   generating the facial embedding of the unmasked portion of the masked face; and
   comparing the generated facial embedding of the unmasked portion with unmasked portion facial embeddings stored in the facial embeddings database to identify matching unmasked portion facial embeddings.

10. The method of claim 1, further comprising authenticating the identified user based on the identifying the user based on the weighted set of matched facial embeddings.

11. A non-transitory computer-readable storage medium storing instructions that, when executed by one or more processors, cause the one or more processors to perform operations for recognizing a masked face, the operations comprising:
   receiving, by a computing device, an image;
   executing a masked face detection algorithm to detect whether the received image includes a masked face;
   in accordance with a determination that the received image includes a masked face:
      determining, by executing a masked face matching algorithm on the received image, whether the masked face matches at least one masked facial embedding stored in a facial embeddings database, and, when the masked face matches at least one masked facial embedding stored in the facial embeddings database, obtaining the matched at least one masked facial embedding from the facial embeddings database;
      determining, by executing an unmasked portion matching algorithm on the received image, whether an unmasked portion of the masked face matches at least one unmasked portion facial embedding stored in the facial embeddings database, and, when the unmasked portion of the masked face matches at least one unmasked portion facial embedding, obtaining the matched at least one unmasked portion facial embedding from the facial embeddings database;
      generating a weighted set of matched facial embeddings based on: the matched at least one masked facial embedding, and the matched at least one unmasked portion facial embedding; and
      identifying a user based on the weighted set of matched facial embeddings,
         the user associated with the at least one masked facial embedding stored in the facial embeddings database.

12. The non-transitory computer-readable storage medium of claim 11, further comprising:
   restoring, by executing a face restoration algorithm on the received image, the masked face to generate an unmasked representation of the masked face, generating an unmasked facial embedding of the unmasked representation of the masked face, and determining whether at least one original unmasked facial embedding from the facial embeddings database matches the generated unmasked facial embedding of the unmasked representation of the masked face, and
   wherein the generating the weighted set of matched facial embeddings is further based on the at least one original unmasked facial embedding.

13. The non-transitory computer-readable storage medium of claim 12, wherein the restoring the masked face to generate the unmasked representation of the masked face includes:
   executing a deep generative adversarial network algorithm against the masked face image to generate a set of candidate facial embeddings of unmasked representations of the masked face;
   identifying facial embeddings in the facial embeddings database matching the candidate facial embeddings to generate a set of matched candidate unmasked facial embeddings;
   applying the set of matched candidate unmasked facial embeddings to a feedback loop to refine the set of candidate facial embeddings of the unmasked representations of the masked face based on the set of matched candidate unmasked facial embeddings; and
   identifying a matching facial embedding of an unmasked representation of the masked face based on the refined set of candidate facial embeddings.

14. The non-transitory computer-readable storage medium of claim 11, further comprising:
   in accordance with a determination that the received image includes an unmasked face:
      executing an unmasked face recognition algorithm to identify a user represented by the unmasked face;
      determining whether the identity of the identified user matches an identify for which an alert condition is met;
      in accordance with a determination that the identity of the identified user matches an identify for which an alert condition is met:
         generating an alert, the alert indicating that the identified user is unmasked; and
         causing, the alert to be sent to the identified user.

15. The non-transitory computer-readable storage medium of claim 11, wherein the at least one masked facial embedding stored in the facial embeddings database is a simulated masked facial embedding.

16. The non-transitory computer-readable storage medium of claim 15, wherein the simulated masked facial embedding stored in the facial embeddings database is generated by:
   obtaining at least one image of an unmasked face;
   obtaining an original unmasked facial embedding of the unmasked face and at least one facial embedding of a simulated mask;
   combining the original unmasked facial embedding of the unmasked face and the at least one facial embedding of the simulated mask to generate the simulated masked facial embedding, wherein the simulated masked facial embedding represents a simulated masking of the unmasked face; and
   storing the simulated masked facial embedding in the facial embeddings database.

17. The non-transitory computer-readable storage medium of claim 16, wherein the facial embedding of the simulated mask represents simulated masks of at least one of different colors, styles, shapes, and textures.

18. The non-transitory computer-readable storage medium of claim 11, wherein the determining whether the masked face matches at least one masked facial embedding stored in the facial embeddings database includes:
   generating the facial embedding of the masked face; and
   comparing the generated facial embedding of the masked face with masked facial embeddings stored in the facial embeddings database to identify matching masked facial embeddings.

19. The non-transitory computer-readable storage medium of claim 11, wherein the determining whether the unmasked portion of the masked face matches at least one unmasked portion facial embedding stored in the facial embeddings database includes:
   executing a semantic segmentation algorithm against the image of the masked face to identify a masked portion of the unmasked face;
   extracting the unmasked portion of the masked face based on the semantic segmentation;
   generating the facial embedding of the unmasked portion of the masked face; and
   comparing the generated facial embedding of the unmasked portion with unmasked portion facial embeddings stored in the facial embeddings database to identify matching unmasked portion facial embeddings.

20. A system for recognizing a masked face, the system comprising:
   a computing device having one or more processors and a memory communicatively coupled to the one or more processors, wherein the one or more processors are configured to:
   receive, by the computing device, an image;
   execute a masked face detection algorithm to detect whether the received image includes a masked face;
   in accordance with a determination that the received image includes a masked face:
      determine, by executing a masked face matching algorithm on the received image, whether the masked face matches at least one masked facial embedding stored in a facial embeddings database, and, when the masked face matches at least one masked facial embedding stored in the facial embeddings database, obtain the matched at least one masked facial embedding from the facial embeddings database;
      determine, by executing an unmasked portion matching algorithm on the received image, whether an unmasked portion of the masked face matches at least one unmasked portion facial embedding stored in the facial embeddings database, and, when the unmasked portion of the masked face matches at least one unmasked portion facial embedding, obtain the matched at least one unmasked portion facial embedding from the facial embeddings database;
      generate a weighted set of matched facial embeddings based on: the matched at least one masked facial embedding, and the matched at least one unmasked portion facial embedding; and
   identify a user based on the weighted set of matched facial embeddings,
      the user associated with the at least one masked facial embedding stored in the facial embeddings database.

* * * * *

UNITED STATES PATENT AND TRADEMARK OFFICE
CERTIFICATE OF CORRECTION

| | | |
|---|---|---|
| PATENT NO. | : 10,984,225 B1 | Page 1 of 1 |
| APPLICATION NO. | : 17/035587 | |
| DATED | : April 20, 2021 | |
| INVENTOR(S) | : Ghosh et al. | |

It is certified that error appears in the above-identified patent and that said Letters Patent is hereby corrected as shown below:

On the Title Page

Item (72) Inventors, delete "Ankur Garg, Gurgaon (HR)" and replace with --Ankur Garg, Gurgaon (IN)--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*